United States Patent [19]
Zheng et al.

[11] Patent Number: 5,892,543
[45] Date of Patent: Apr. 6, 1999

[54] IMAGING SYSTEM INCLUDING AN AUTO ZOOM CONTROLLER

[75] Inventors: Joe Zheng, Brookfield, Conn.; Kexiang Ding, Vestal, N.Y.; Shiying Law, Old Bridge, N.J.

[73] Assignee: United Parcel Service of America, Inc., Atlanta, Ga.

[21] Appl. No.: 464,293

[22] Filed: Jun. 5, 1995

[51] Int. Cl.⁶ .................................................. H04N 5/232
[52] U.S. Cl. ........................... 348/347; 348/349; 348/358
[58] Field of Search ..................................... 348/207, 345, 348/347, 348, 349, 354, 355, 358, 351, 222; 235/462, 472, 454; 354/400, 402, 403; 358/473, 474, 482, 483; 396/72, 77, 78, 79, 80, 81, 82

[56] References Cited

U.S. PATENT DOCUMENTS

| | | | |
|---|---|---|---|
| Re. 33,081 | 10/1989 | Murakami et al. | 358/227 |
| 4,136,821 | 1/1979 | Sugiura et al. | 235/462 |
| 4,531,158 | 7/1985 | Murakami et al. | 358/227 |
| 4,788,603 | 11/1988 | Fujimura et al. | 358/342 |
| 4,808,804 | 2/1989 | Krichever et al. | 235/462 |
| 4,874,936 | 10/1989 | Chandler et al. | 235/494 |
| 4,877,949 | 10/1989 | Danielson et al. | 235/462 |
| 4,908,500 | 3/1990 | Baumberger | 235/384 |
| 4,920,255 | 4/1990 | Gabeler | 235/454 |
| 4,951,075 | 8/1990 | Tokumaru et al. | 396/78 |
| 5,060,001 | 10/1991 | Kaneda | 354/400 |
| 5,113,214 | 5/1992 | Nagata et al. | 354/402 |
| 5,164,756 | 11/1992 | Hirasawa | 354/400 |
| 5,173,807 | 12/1992 | Kaneda et al. | 359/698 |
| 5,185,822 | 2/1993 | Miura | 382/65 |
| 5,200,828 | 4/1993 | Jang et al. | 358/227 |
| 5,204,710 | 4/1993 | Tsukamoto et al. | 354/402 |
| 5,216,230 | 6/1993 | Nakazawa | 235/462 |
| 5,308,966 | 5/1994 | Danielson et al. | 235/472 |
| 5,325,206 | 6/1994 | Fujita et al. | 348/347 |
| 5,349,382 | 9/1994 | Tamura | 348/345 |
| 5,424,776 | 6/1995 | Hirasawa | 348/345 |
| 5,678,072 | 10/1997 | Suzuki et al. | 396/78 |

FOREIGN PATENT DOCUMENTS 5-130481  5/1993  Japan .

OTHER PUBLICATIONS

Sony Operator Manual For EVI–310 CCB Camera (excerpted: 3 unnumbered pages).

*Primary Examiner*—Andrew I. Faile
*Assistant Examiner*—Ngoc-Yen Vu
*Attorney, Agent, or Firm*—Jones & Askew, LLP

[57] ABSTRACT

An improved system using an auto focus camera for capturing images of interested objects in the same image resolution over a large range of object distances. The system provides a camera including a zoom lens system responsive to a zoom signal Z and an auto focus lens system, comprising an imaging system operative to image one or more objects at varying object distances, an auto focus controller operative to adjust the auto focus lens system based on a characteristic of the image so as to maintain the object in focus and to output an auto focus status signal, and an auto zoom controller operative to adjust Z by an amount obtained by applying a function to the auto focus status signal, as it varies with the object distance, to maintain an approximately uniform image resolution.

15 Claims, 6 Drawing Sheets

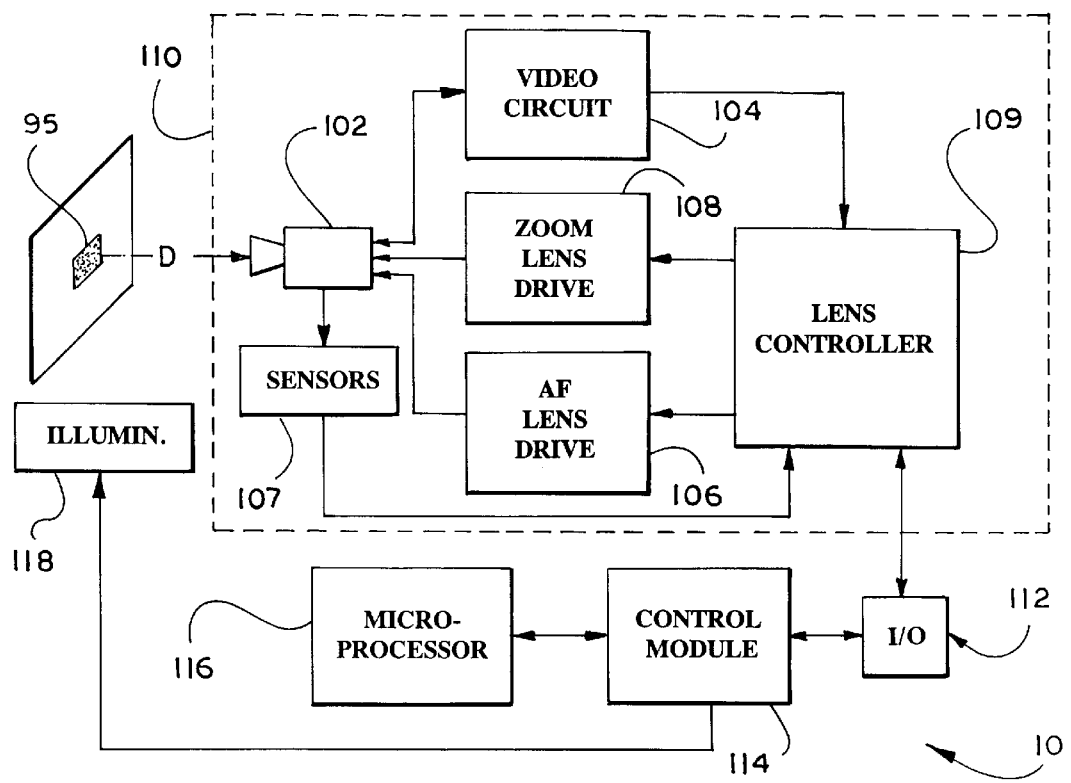
*Fig_1*
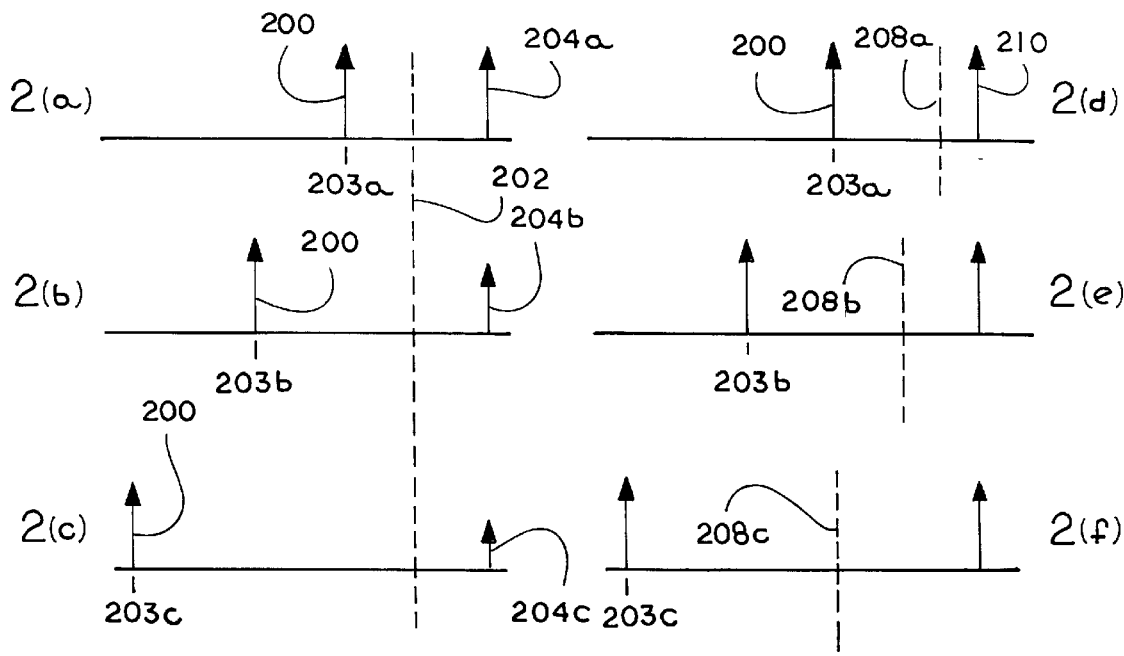
*Fig_2*

Fig_5

Fig_6

IMAGING SYSTEM INCLUDING AN AUTO ZOOM CONTROLLER

TECHNICAL FIELD

This invention relates generally to video camera-based handheld image grabbing systems, and more particularly relates to an auto zoom control system for capturing images at the same resolution regardless of variations in object distance.

BACKGROUND OF THE RELATED ART

An optical symbology is an information encoded symbol that is only readable by an optical sensing mechanism through a decoding process. For years, the bar code has been promoted as a machine readable symbology. A bar code is a one-dimensional symbol that contains a unique serial number encoded in black and white bars. As the demand for the information-based technologies grows, a number of two-dimensional symbologies, either in the form of a stacked bar code or a matrix, have been introduced to accommodate the need for storing more data information. This type of symbology is also referred to as a dense code. One of them, the MaxiCode symbology, is described in U.S. Pat. Nos. 4,874,936 and 4,896,029.

Generally there are two types of reading devices for symbologies, laser-based readers and devices based on Charge Coupled Device (CCD) cameras. The first type offers long range reading and does not -have focus problems while the second type offers cost-effective means and is more rigid in hostile environments.

Two-dimensional symbologies such as the MaxiCode cannot be acquired and decoded by the laser spot scanners typically used to scan single line bar codes. Attempts have been made to modify such devices to perform raster scanning operations on stacked bar codes and two-dimensional codes. However, this approach is too lengthy for practical high speed applications. A faster method is to acquire an image of the entire two-dimensional symbology using an electronic camera. CCD sensor arrays of the type used in video cameras are suitable. They consist of a matrix of "pixels" each of which stores a cumulative charge according to the amount of light which strikes the pixel. The pixel values are read out, converted and stored in a corresponding matrix in a digital memory for evaluation and processing.

One of the problems with a CCD camera-based symbology reader is its limited depth of field. To ensure the focus of a symbol to be decoded, a shroud for providing a fixed focal length is often used. There are many contact readers in the art which use a physical hood or a shroud to define a fixed object distance equal the focal length of the CCD camera. However, the contact of the shroud with the symbol results in much inconvenience in practice, especially in handheld applications. Furthermore, contact with the object bearing the symbol is simply not possible in over-the-belt applications.

To solve the focusing problem, attempts have been made to provide an automatic focus adjustment. For example, U.S. Pat. No. 5,308,966 to Danielson and et al. discloses a handheld CCD camera-based bar code reader employing a distance measuring system that uses an ultrasonic signal source to adjust the focusing mechanism. The distance measuring system detects the distance between the camera and the target to be imaged and then sends a signal to the camera mechanism to reposition some mirrors to alter the optical path so as to change the focal length to match the object distance.

Distance measurement based on the alterations in the received signal reflected from a target has been much explored in photographic camera technology. For example, an auto focus circuit may detect high frequency elements from the video signal, and focus to the subject with much brightness and contrast in the measuring area of the center screen. However, when such systems are provided in a camera that also has a zoom lens, the auto focus stops working properly inside a minimum distance, which increases as the zoom lens is moved toward the telephoto end of its range of movement. Also, if the object distance is beyond a certain range, measurement errors occur due to the weak reflected signals. Moreover, the reflected signal is subject to degradation caused by the surface characteristics of the target.

Generally, the image resolution varies with the object distance. The further the object is from the lens, the lower the resolution. In many situations, when an object is far away from a camera, the resolution may be low to the point of just blurring signals. On the other hand, the nearer the object is to the lens, the larger the number of dots per inch (dpi) on the object the detector can capture. Eventually, the resolution may become high to the point of being useless. Furthermore, software to decode dense codes must be more complex and will operate more slowly if the resolution of the image varies from object to object. Therefore, there has been a need in the art for systems that capture images of objects in the same resolution independent of the distance of the objects from the camera.

The concept of auto zoom has been developed for video cameras which have auto focus and zoom lenses. Various auto zoom methods have been devised to keep the image size constant while the object distance varies. U.S. Pat. No. 5,113,214 describes an optical zoom lens system which provides auto focus based upon detecting characteristics of the signal derived from a CCD. Auto zoom is achieved by first moving the auto focus lens to a predetermined position at which it remains fixed. Then the auto focus circuit sends a signal to adjust the zoom lens in a manner which both adjusts the focus and varies the size of a subject so that size of the subject is always constant regardless of changes in the object distance. This system has the disadvantage of requiring extra controls for both the auto focus lens and the zoom lens, and the auto focus lens is not allowed to work normally in the auto zoom mode. The system of this prior patent perhaps disables the normal auto focus function to avoid the auto focus minimum distance problem described above which occurs when the zoom moves too far toward the telephoto.

U.S. Pat. No. 5,173,807 also describes an auto focus and auto zoom system. An infra-red range finder provides the object distance to an auto focus lens controller. The zoom lens control monitors the auto focus lens position and follows the detected movement of the auto focus lens to make the size of an object in the picture plane substantially constant. This system has the disadvantage of requiring a separate range finder and a special set of pulse generators for knowing the amount of rotation of the auto focus and zoom motors.

There remains a need in the art for an auto zoom system that does not require a separate range finder, that allows an auto focus system to function normally, and that is not subject to problems resulting from the limitations of auto focus systems which operate based on the alterations in the received signal.

SUMMARY OF THE INVENTION

The present invention has been made in consideration of the above described problems. The present invention provides an improved system using an auto focus camera for capturing images of objects in the same image resolution over a large range of object distances.

According to one aspect of the invention, the system using a camera with an auto focus capability receives a focus signal from the camera and then sends a control signal to control the motors controlling the zoom lens in the camera. The control signal is generated independently from other camera operations. Thus, a control module or other controller system can be altered to work with various cameras originally designed for manual zoom control.

As will become clear in the following description, the parameters determined in the control module are subject to the auto focus signal from the camera. It will be understood by those skilled in the art that the present invention is not limited to reading optical symbologies. For example, by altering the control parameters, the present invention can also be used to capture label images for optical character recognition.

Generally described, the present invention provides a camera including a zoom lens system responsive to a zoom factor Z, and an auto focus lens system, comprising an imaging system operative to image one or more objects at varying object distances, an auto focus controller operative to adjust the auto focus lens system based on one or more characteristics of the image so as to maintain the object in focus and to output an auto focus status signal, and an auto zoom controller operative to adjust Z by an amount obtained by applying a function to the auto focus status signal, as it varies with the object distance, to maintain an approximately uniform image resolution.

Preferably, the auto zoom controller maintains Z in a range in which Z, as needed to maintain an approximately uniform image resolution as the object distance varies, can be represented approximately as an empirically determined function of the auto focus status signal.

For some cameras, the function preferably is $$Z = A + Bf$$

where A is approximately 16 to 20 and B is approximately −0.02 to 0.02 to maintain an approximately uniform resolution. Preferably, Z is maintained below about 5.2, and below about 5.5 when the object distances are above about ten inches.

The present invention also provides a method of operating a zoom lens system responsive to a zoom factor Z in a camera including an auto focus lens system, comprising the steps of imaging with the camera one or more objects at varying object distances, providing an auto focus command signal to the auto focus lens system so as to maintain the object in focus, providing an auto focus status signal representative of the state of the auto focus lens system, determining a value of Z below which Z, as needed to maintain an approximately uniform image resolution as the object distance varies, can be represented approximately as a function of the auto focus status signal, empirically determining the function, and adjusting Z by an amount obtained by applying the function to the auto focus status signal as it varies with the object distance to maintain an approximately uniform image resolution.

Therefore, an important object of the present invention is to provide a generic solution to decoding optical symbols in handheld and over-the-belt reader applications.

It is a further object of the present invention to provide an improved auto zoom system for cameras.

It is a further object of the present invention to provide an auto zoom system that is not dependent on a separate range finder in a camera.

It is a further object of the present invention to provide an auto zoom system that accounts for the minimum focus distance limitations of auto focus systems which operate based on detected characteristics of images.

Other objects, features and advantages of the present invention will become apparent upon examining the following detailed description of an embodiment thereof, taken in conjunction with the attached drawings.

BRIEF DESCRIPTION OF THE DRAWINGS

FIG. 1 is a general block diagram of a system configuration in accordance with the subject invention.

FIGS. 2(a)–2(f) are diagrams which illustrate the principle of auto zoom.

DETAILED DESCRIPTION

Figure 3:
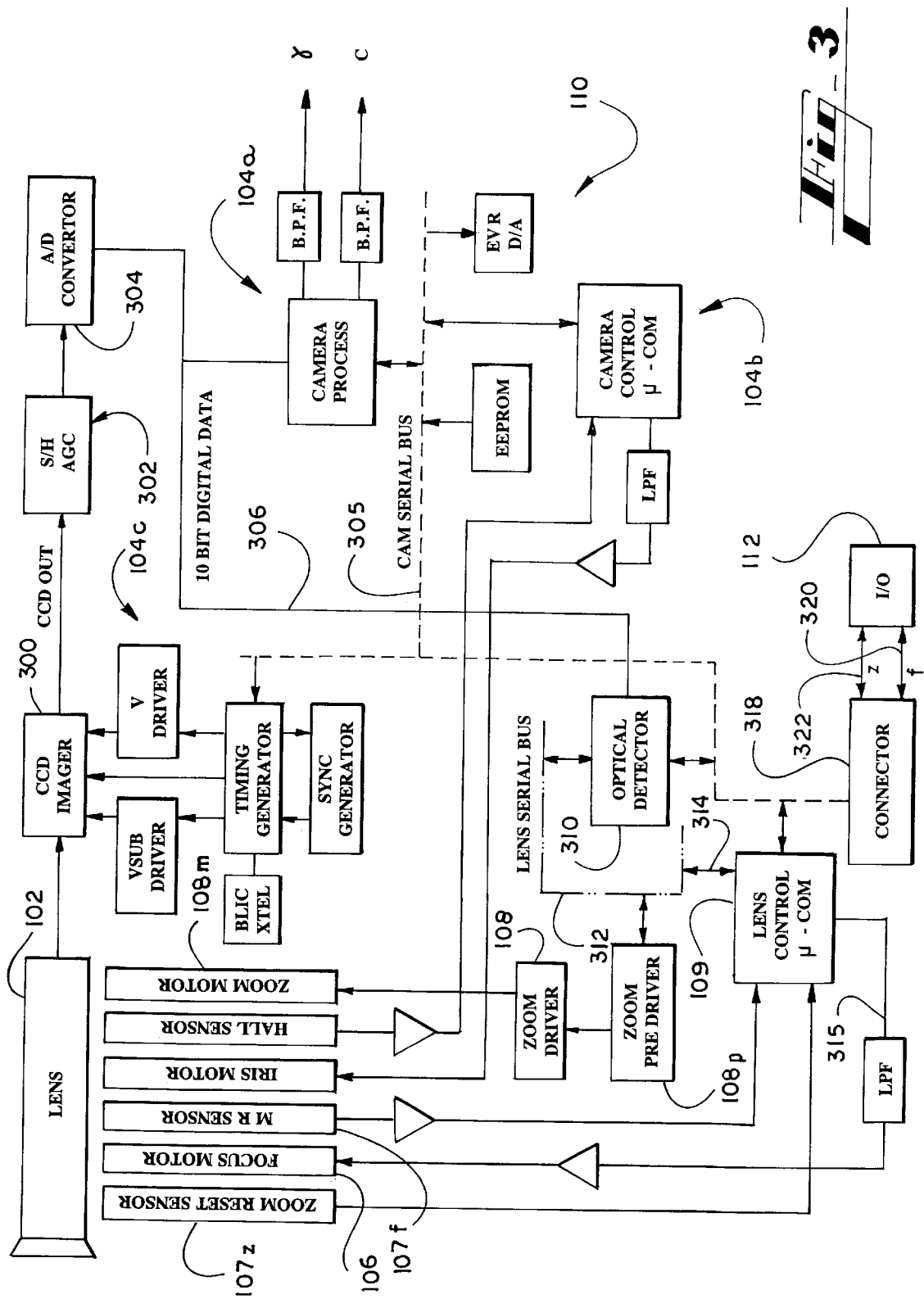
FIG. 3 is a more detailed block diagram of the video camera and auto zoom control interface of the system of FIG. 1.

Referring now to the drawings, in which like numerals refer to like parts throughout the several views, FIG. 1 shows a CCD imaging system 10 in which there is a video camera module 110 coupled via an interface card 112 with a control module 114, which operates under control of a microprocessor 116.

The camera module includes an optical lens system 102, a video circuit 104, an auto focus driver 106, a set of sensors 107, a zoom driver 108, and a lens controller 109. The camera module used in the preferred embodiment is Model EVI-310 with an RS-232 interface card IF-51, both manufactured by Sony Electronics Inc. in Japan. The camera module 110 was originally designed for video cassette recorders and is being used in SONY Camcorder CCD TR101. The camera auto focus system relies on detection of high frequency elements from the video signal, which are processed by the lens controller 109. The auto focus driver 106 adjusts the lens system 102 to focus to the subject or object 95 with high brightness and contrast at the center of the image. The zoom system in the Camcorder version receives control inputs from conventional manually operated switches, one to zoom toward wide angle, and the other to zoom toward telephoto. When the zoom is at maximum wide angle, the auto focus system performs properly from an object distance of 1 cm to infinity. This minimum auto focus distance increases to 90 cm when the zoom is at maximum telephoto.

The camera 110 once powered and set to an automatic mode thus keeps images sharp continuously through its conventional auto focus system regardless of the object distance larger than these minimum auto focus distances.

The control system added by the present invention to provide auto zoom comprises a control module 114 under control of a microprocessor 116. Through the interface card 112, an auto focus status signal that indicates the camera module is in a focused position is extracted from the lens controller 109 and coupled to the control module 114. The control module performs interface functions and is controlled by the microprocessor 116. Upon receiving the auto focus status signal, the control module 114 calculates a zoom control signal based on a desired image resolution, for example 100 dpi, and then sends the control signal out to the lens controller 109 in the camera through the interface card 112. In response to the control signal, the lens controller operates the zoom driver 108 to implement the desired zoom factor. The present invention is preferably implemented in BASIC computer language and configured in a personal computer, such as COMPAQ Deskpro 50M manufactured and marketed by Compaq Computer Corporation in Texas.

The principle of auto zoom can be better understood with reference to the diagrams of FIGS. 2(a)–2(f). The optical path depicted in FIGS. 2(a)–2(c) is for a regular camera without auto zoom. As an object 200 varies in position from point 203a to 203b to 203c, its distance from the camera lens position, represented by the dashed line 202, also varies, resulting in different image sizes 204a–204c. It should be noted that the camera itself maintains the same resolution in terms of the number of photosensor cells in the CCD, yet in FIGS. 2(a)–2(c) the image resolution in dots per inch of a certain target in an image depends on the distance of the target from the camera. Generally the farther the object distance, the lower the image resolution.

The optical path depicted in FIGS. 2(d)–2(f) is for a camera with an auto zoom function which makes the image resolution, or image size 210, tend to be the same as the object distance varies. Thus, while the object 200 varies in distance from the camera in the manner described above, the camera lens position is adjusted accordingly from position 208a to 208b to 208c. The result is a constant image size 210.

The present invention provides an improved auto zoom system by implementing control of the camera zoom lens system. The camera module 110 and interface card 112 according to the present invention are shown in more detail in FIG. 3. The camera's conventional lens system 102 receives light reflected from the object 95 and directs the light to a CCD imager 300. An analog output signal from the CCD is modified by an automatic gain control circuit 302, and then by an analog-to-digital converter 304. Ten bit digital data representing the image is output along line 306 to various components of the video circuit 104. A camera process circuit 104a converts the signal into conventional video output signals Y and C for display on television monitors. A camera control microcomputer 104b automatically controls the lens aperture responsive to characteristics of the image in a known manner. A CCD control circuit 104c automatically adjusts the video drivers and exposure time of the CCD sensor, receiving input via a camera serial bus 305.

An optical detector 310 receives the ten bit digital signal directly from the A/D converter 304. The optical detector analyzes characteristics of the image in a known manner to detect the highest frequency elements for auto focusing. The output of the optical detector 310 is connected via a lens serial bus 312 to the lens controller 109, which in the preferred Sony camera is a microcomputer. The lens controller 109 also receives inputs from elements of the sensor package 107, such as an MR sensor 107f. The lens controller computes control signals for the auto focus motor 106, which receives such signals along line 315. The lens controller can output a focus status signal to the camera serial bus 305, which transmits it to other camera control circuits.

The lens controller 109 in the Camcorder version of the camera module 110 also receives input signals from manually operated wide angle and telephoto switches (not shown), which are connected to the camera serial bus 305. In response to these Camcorder controls, the lens controller sends control signals via a line 314 to the lens serial bus and to a zoom pre-driver circuit 108p, which in turn controls the zoom driver circuit 108, which operates a zoom lens motor 108m to zoom the lens system 102 in the direction mandated by the manual input.

In the imaging system according to the present invention, the manually operated zoom switches are replaced by the control module 114 under control of the microprocessor 116. These elements are connected to the camera serial bus 305 of the camera module 110. The bus 305 terminates in a multi-pin connector 318, including two pins 320 and 322 for addressing the lens controller 109. The interface card 112 is connected to the bus connector to interface the control module 114 with the pins 320 and 322. The control module 114 determines the zoom signal based on a formula described below, based on the auto focus status signal.

It will be understood by those skilled in the art that other control signals can also be obtained from the control module 114, for example to control an illumination device 118 in the case of a low ambient lighting condition.

Figure 4:
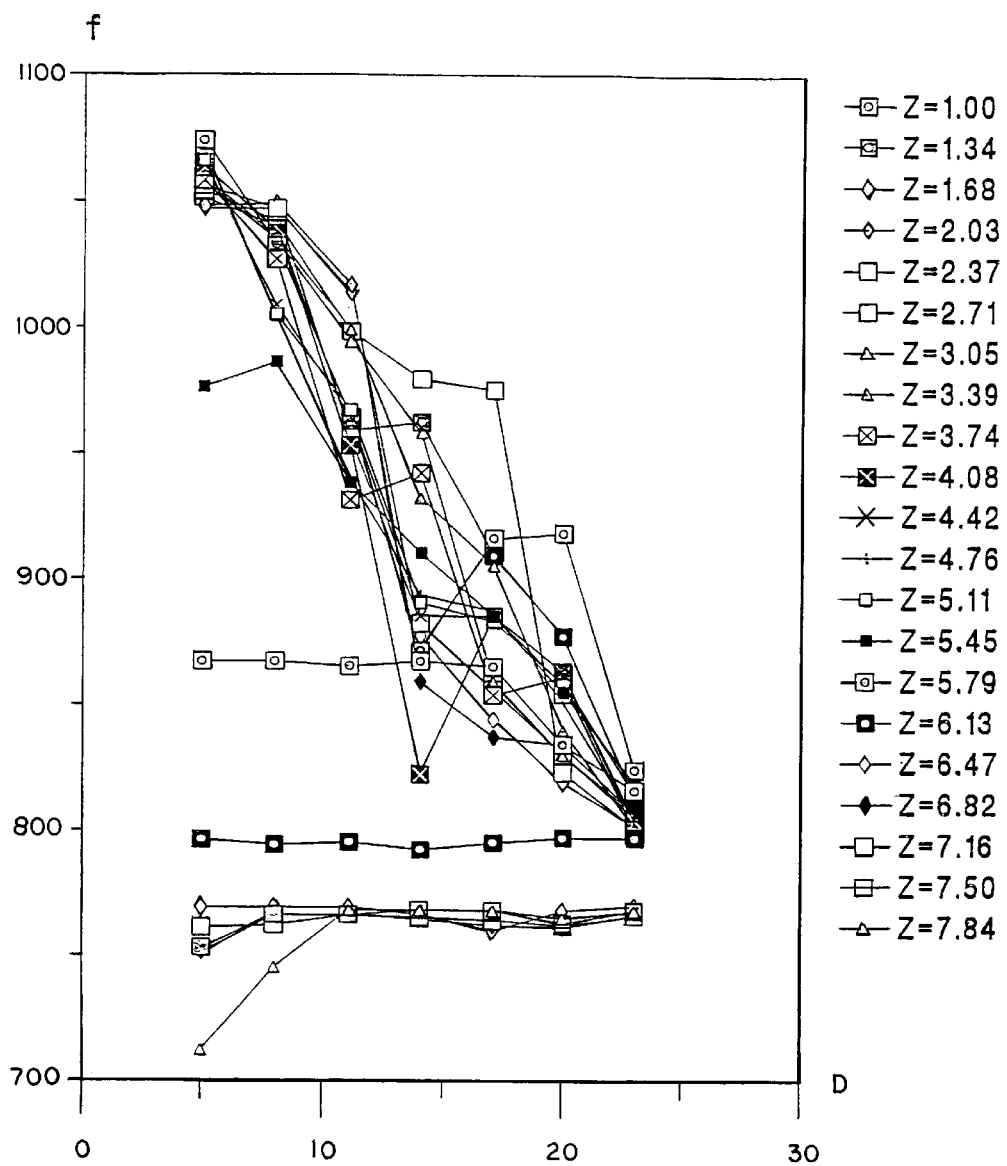
FIG. 4 is a graphical illustration demonstrating the empirical relationship between object distance and focus status as the zoom factor is changed, for a particular video camera.
Figure 5:
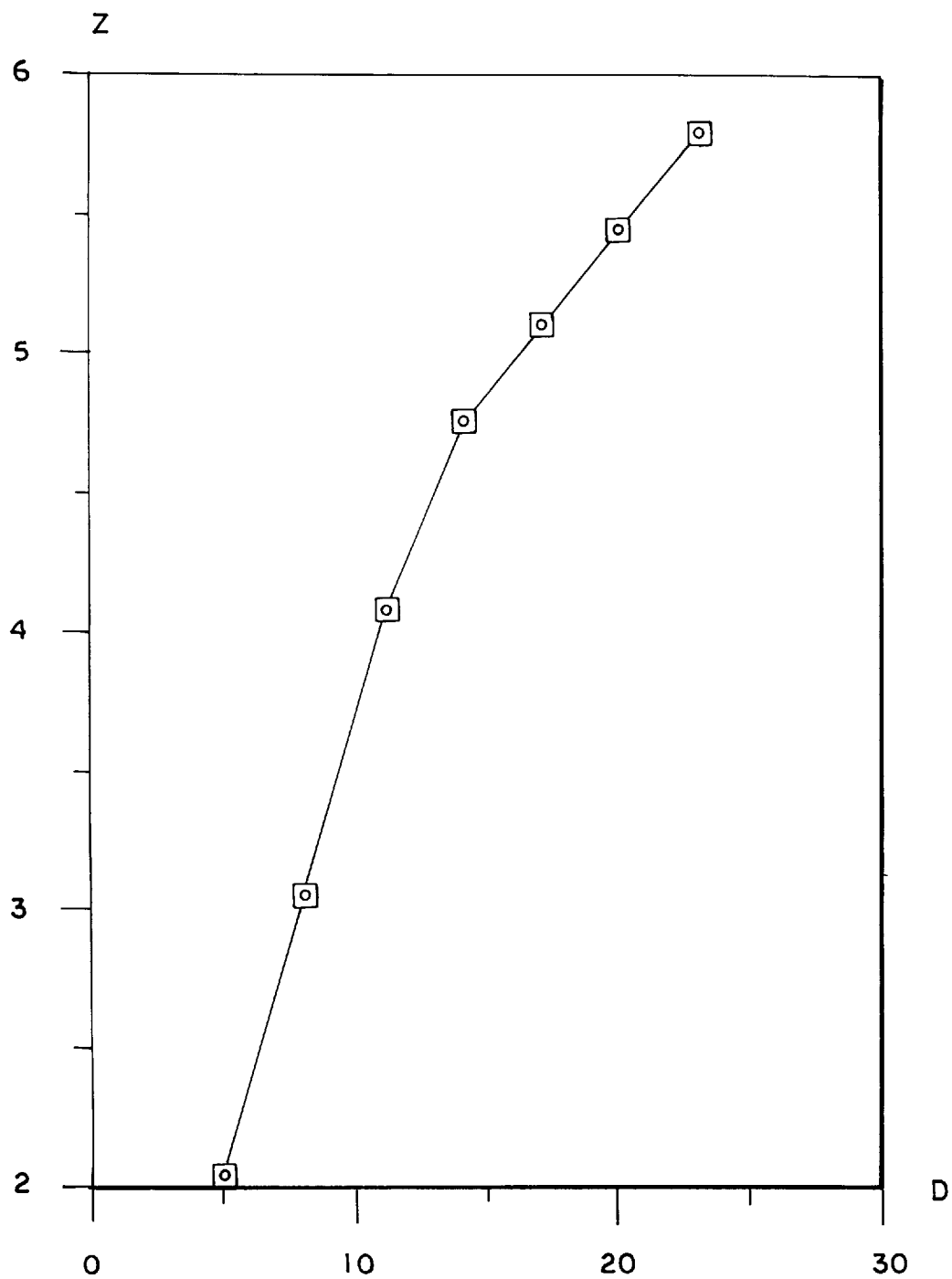
FIG. 5 demonstrates the relationship between distance and zoom status level when an image resolution of 100 dpi is maintained.
Figure 6:
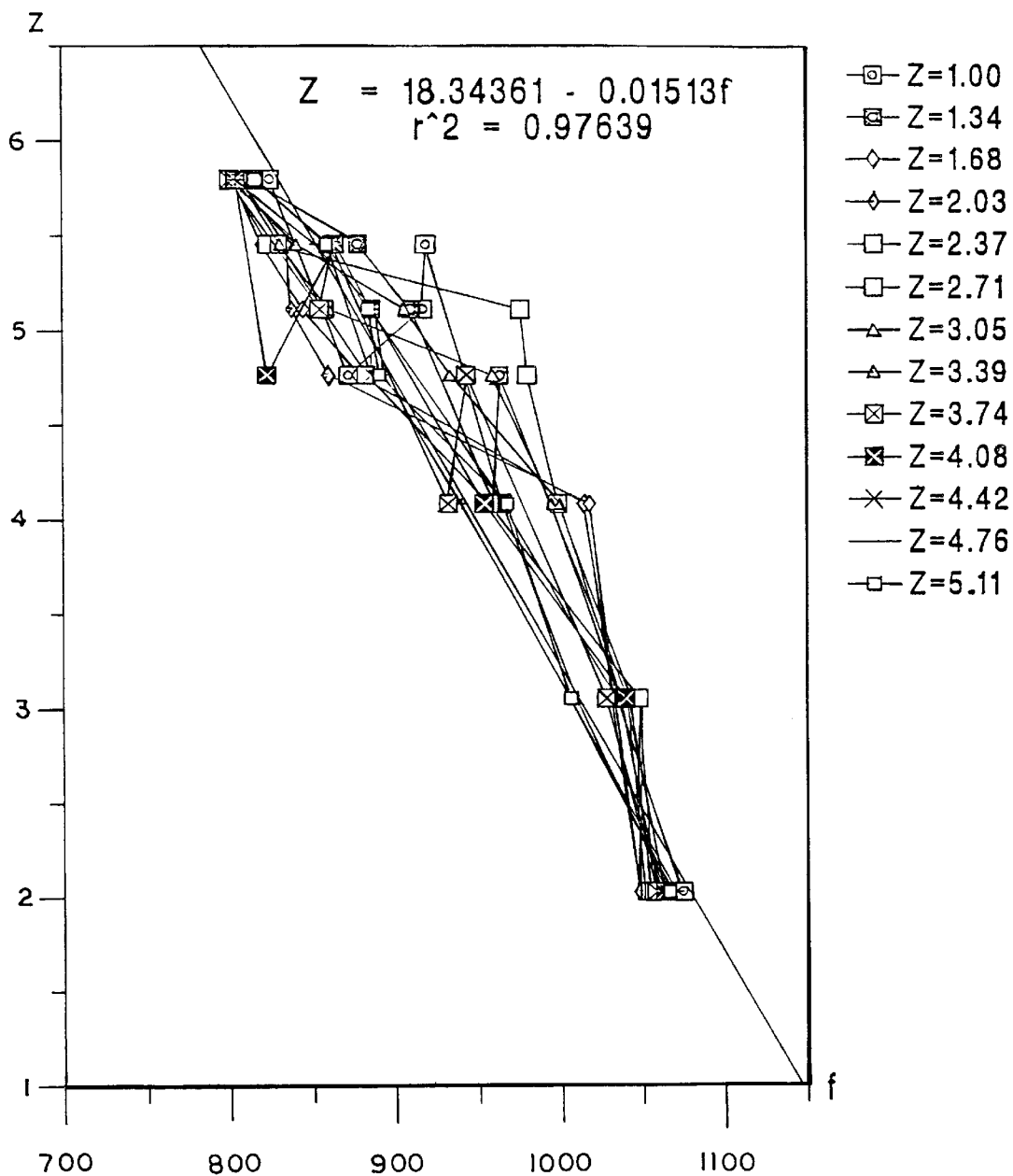
FIG. 6 demonstrates the relationship between focus status and zoom status when an image resolution of 100 dpi is maintained.

FIGS. 4, 5, and 6 show a plurality of curves that reveal the relationship among the object distance, zoom status and auto focus status. The curves are obtained from experimentation with the same camera module. For a camera that has auto focusing capabilities, the auto focus status signal can be represented by a sequence of numerical values through a function when the object is located a certain distance from camera and the zoom status is in a certain state. Therefore the numerical values indicated in the figures may not necessarily have quantitative meanings; only relative quantities expressed as ratios are used in the following specification. The auto focus status signals were measured under different distance and zoom conditions in the experiments. The results of the experiments show that, for the particular camera tested, the auto focusing is reliably related to the object distance when the zoom status level is less than 5.11, as shown in FIG. 4. Therefore, the distance between camera and object can be estimated by an auto-focusing function F provided it is known that the camera zoom status level is less than 5.11:1:

$$D = F(f)$$

where D is the distance between camera and object, F is the auto focusing function and f is the current auto focus status signal received from the camera. It is also seen from FIG. 5 that the zoom status level is related to the distance between the camera and the object when capturing an object image in the same resolution (here 100 dpi). Hence the relationship between them may be expressed by a function G:

$$Z = G(D)$$

where Z is assumed to be the estimated zoom factor needed for obtaining the same dpi image. To combine the two equations shown above results in the following expression:

$$Z = G(F(f)) = H(f)$$

where a new function H is used to represent the combination of the two functions G and F. The foregoing equations are only for the purpose of inferring the relationship between the zoom status level and the auto focus status signal if the previous zoom status level was less than 5.11:1. FIG. 6 demonstrates the numerical relationship between f and Z and thus a linear regression equation based on the expressed relationship Z=H(f) is written as:

$$Z = A + Bf \qquad (1)$$

In the preferred embodiment, A=18.34 and B=0.015, obtained based on the correlation coefficient $r^2$=0.97639 in FIG. 6 for the image resolution of 100 dpi. Those skilled in the art will understand that $r^2$ will vary with the selected resolution the user desires to maintain, and that $r^2$ can be determined in the same manner for other selected resolutions. Acceptable results may be obtained for the Sony camera described if A is in range from approximately 16 to 20 and B is in a range from approximately −0.02 to 0.02. Those skilled in the art can empirically determine A and B in the same manner for different cameras and different resolutions. This relationship has been shown to provide acceptable results for object distances from about 5 inches to about 6 feet.

As may be seen in FIG. 4, the threshold Z level of 5.11 optionally may be changed to 5.45 when the object distance is greater than about 10 inches, and to 5.79 when the object distance is greater than about 18 inches.

Figure 7:
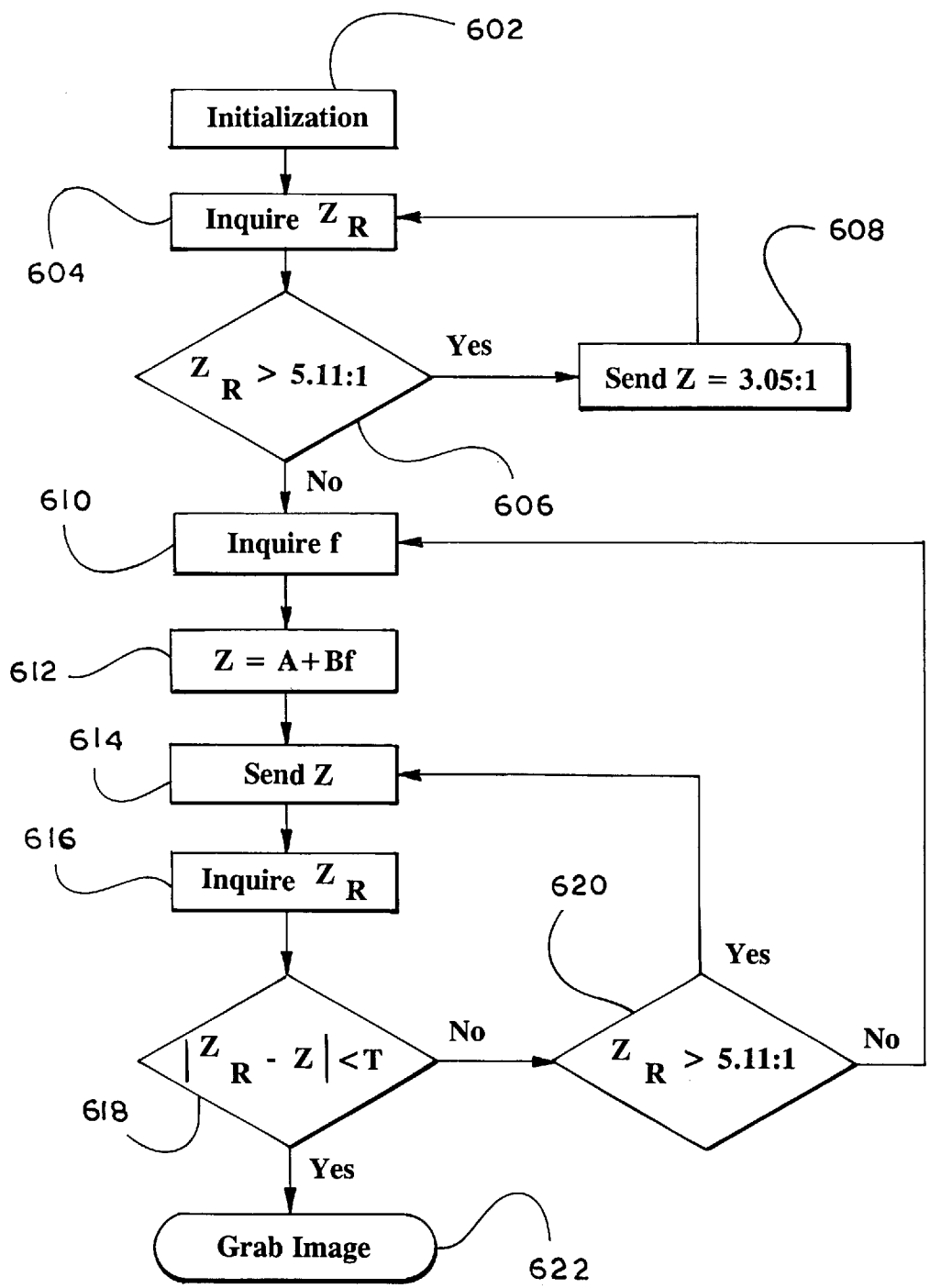
FIG. 7 depicts a flow chart outlining the procedure for controlling the auto zoom function in accordance with the subject invention.

Referring now to FIG. 7, there is depicted a system flow chart in accordance with the present invention. To ensure a correct camera zoom, the control system is initialized in a conventional manner at 602. Immediately following the initialization, the camera module is in auto focus mode, continuously grabbing sharp images. The control module 114 at 604 sends an inquiry via the interface card 112, the pin 322, and the bus 305, to the lens controller 109 of the camera module 110, requesting the current zoom status level $Z_R$. When $Z_R$ is returned to the controller 114, it then performs a comparison test at 606 to see if the zoom status $Z_R$ is larger than the ratio 5.11:1. If the zoom status $Z_R$ is larger than 5.11:1, this indicates an unsuccessful initialization. An unsuccessful initialization indicates that the camera zoom cannot be exactly set as the control system instructs. To ensure the exact performance of the camera in this case, at 608 the control module 114 sends to the lens controller 109 a zoom factor Z in the range of (1:1 to 5.11:1), also via the pin 322, to force the camera into a desired zoom status. A zoom factor Z=3.05:1 is selected in the preferred embodiment to reset the camera.

When the detected current zoom status level is less than 5.11:1, at 610 the control module 114 sends an inquiry to the lens controller 109, via the interface card 112, the pin 320, and the bus 305, requesting the auto focus status f of the camera. The status f is received back from the lens controller 109 via pin 320. Then at 612, a required zoom factor is estimated from the current auto focus status signal using Equation (1). The control module 114 then sends the zoom factor Z at 614 via pin 322 to the lens controller 109. The lens controller in turn controls the zoom motor 108m in the camera to move the zoom lens to a position corresponding to the transmitted zoom factor. The new position of the zoom lens will be reflected in a new value of the zoom status level $Z_R$ measured by the camera.

The present invention is practiced with an existing camera module. There are a few parameters which are uncontrollable in the camera and the motors may overshoot. Therefore a verification process is followed, according to which the control system rechecks the status of the camera module. One more inquiry of the current zoom status signal $Z_R$ is sent at 616. To increase the efficiency of the zoom system, a tolerance test is carried out at 618, to find the difference between the actual zoom status level and the desired zoom status level, i.e. $|Z_R-Z|$. If the difference is not large and is within a predetermined tolerance T, the image at that zoom and that focus is accepted at 622. It will be understood by those skilled in the art that the step 618 is to increase the efficiency of the zoom system. The tolerance range, however, is instrumental to the overall performance of the control system. A low tolerance would require more loops to converge to the desired zoom status level. In the preferred embodiment, the tolerance T is set to 0.55 to obtain a satisfactory speed for maintaining the image resolution about 100 dpi when the object distance moves within a range from 5 to 30 inches.

When the difference between the desired zoom status level and the actual zoom status level is beyond the tolerance T, there is a need to find what caused the inconsistency. The current zoom status signal $Z_R$ again is tested at 620 to see if it is greater than 5.11. If the current zoom status level is out of the range, that means the actual zoom status $Z_R$ has not been set properly by the transmitted zoom factor which requested a desired level Z. The program returns to step 614 and the control module 114 then sends the calculated Z to the camera module again to ensure the proper status of the camera. A renewed inquiry for $Z_R$ is made at 616. At 618, if the difference $|Z_R-Z|$ is still beyond the tolerance T, but at 620 the current zoom status level is less than 5.11, a new zoom factor Z has to be determined based on the Equation (1). Therefore, the program returns to step 610, makes a renewed inquiry for the current value of f, and repeats the subsequent steps.

Experiments using the foregoing technique have shown that the image resolution can be controlled within 15% variation when an object is moved within 5 to 30 inches from the camera.

Thus, it will be seen that the present system and method uses an auto focus camera for capturing images of objects in the same image resolution over a large range of object distances. The camera zoom function is controlled by applying a function to the auto focus status signal, as it varies with the object distance, without disabling the auto focus function of the camera.

Alternative embodiments will become apparent to those skilled in the art to which the present invention pertains without departing from its spirit and scope. Accordingly, the scope of the present invention is defined by the appended claims rather than the foregoing description.

What is claimed is:
1. An imaging system, comprising:
   a detector comprising an array of pixels positioned to receive light from an object;
   a read-out circuit connected to said detector to obtain data signals from said pixels and to form in a memory device an image of said object at varying object distances;
   an auto focus lens system including at least one auto focus lens, and an auto focus motor for moving said auto focus lens;
   an auto focus controller providing operating commands to said auto focus motor responsive to characteristics of said image, and outputting an auto focus status signal;
   a zoom lens system comprising at least one zoom lens and a zoom motor for moving said zoom lens;
   said auto focus status signal being approximately linearly related to the object distance for a range of zoom lens positions; and an auto zoom controller operative to set said zoom lens within said range of positions and operative responsive to said auto focus status signal to provide zoom commands to said zoom motor to maintain an approximately constant image resolution when said zoom lens position is within said range;

said auto focus controller continuing to move said auto focus lens while said auto zoom controller is operative.

2. A camera including a zoom lens system comprising at least one zoom lens responsive to a zoom factor Z, and an auto focus lens system, comprising:

an imaging system operative to image one or more objects at varying object distances;

an auto focus controller operative to adjust said auto focus lens system so as to maintain said object in focus and to output an auto focus status signal, said auto focus status signal being approximately linearly related to the object distance for a range of zoom lens positions; and an auto zoom controller operative to adjust Z by an amount obtained by applying a function to the auto focus status signal, as it varies with the object distance, to maintain an approximately uniform image resolution in images of said one or more objects at each of said object distances;

said auto focus controller continuing to move said auto focus lens so as to maintain said object in focus throughout the time said auto zoom controller is operative to maintain an approximately uniform image resolution.

3. The camera of claim 2, wherein said auto zoom controller maintains Z in a range in which Z needed to maintain the approximately uniform image resolution as the object distance varies can be represented approximately as an empirically determined function of the auto focus status signal.

4. The camera of claim 3, wherein said empirically determined function of the auto focus status signal is a linear regression equation based on the empirical relationship between the auto focus status signal and Z.

5. A camera including a zoom lens system responsive to a zoom factor Z, and an auto focus lens system, comprising:

an imaging system operative to image one or more objects at varying object distances;

an auto focus controller operative to adjust said auto focus lens system so as to maintain said object in focus and to output an auto focus status signal; and an auto zoom controller operative to maintain Z in a range in which Z needed to maintain an approximately uniform image resolution as the object distance varies can be represented approximately as an empirically determined function of the auto focus status signal, and operative to adjust Z by an amount obtained by applying to the auto focus status signal, as it varies with the object distance, the function $$Z = A + Bf$$

where f is said auto focus status signal, A is approximately 16 to 20, and B is approximately −0.02 to 0.02, to maintain the approximately uniform image resolution in images of said one or more objects at each of said object distances.

6. The camera of claim 5, wherein said auto zoom controller is operative to maintain Z below about 5.2.

7. The camera of claim 6, wherein said uniform image resolution is about 100 dpi.

8. The camera of claim 5, wherein said auto zoom controller is operative to maintain Z below about 5.5 when said object distances are above about ten inches.

9. A method of operating a zoom lens system, comprising at least one zoom lens, responsive to a zoom factor Z in a camera including an auto focus lens system, comprising the steps of:

imaging one or more objects at varying object distances with said camera;

operating said auto focus lens system so as to maintain said object in focus;

providing an auto focus status signal representative of the state of said auto focus lens system, said auto focus status signal being approximately linearly related to the object distance for a range of zoom lens positions;

determining a value of Z below which the Z needed to maintain an approximately uniform image resolution as the object distance varies can be represented approximately as a function of the auto focus status signal;

empirically determining said function;

adjusting Z by an amount obtained by applying said function to the auto focus status signal as it varies with the object distance to maintain an approximately uniform resolution in images of said one or more objects at each of said object distances; and moving an auto focus lens of said auto focus lens system so as to maintain said object in focus, while operating said zoom lens system responsive to said zoom factor Z to maintain the approximately uniform image resolution.

10. A method of operating a zoom lens system responsive to a zoom factor Z in a camera including an auto focus lens system, comprising the steps of:

imaging one or more objects at varying object distances with said camera;

operating said auto focus lens system so as to maintain said object in focus;

providing an auto focus status signal f representative of the state of said auto focus lens system; and adjusting Z as f changes by an amount given by $$Z = A + Bf$$

where A is approximately 16 to 20 and B is approximately −0.02 to 0.02, to maintain an approximately uniform resolution in images of said one or more objects at each of said object distances.

11. The method of claim 10, further comprising the step of maintaining Z below about 5.2.

12. The method of claim 11, wherein said resolution is approximately 100 dpi.

13. The method of claim 10, further comprising the step of maintaining Z below about 5.5 when said object distances are above about ten inches.

14. The method of claim 13, wherein said resolution is approximately 100 dpi.

15. The method of claim 10, further comprising the step of maintaining Z in a range for which (Z=A+B f) is operative to maintain the approximately uniform resolution in said images.

* * * * *